United States Patent [19]
Horton

[11] Patent Number: 5,413,177
[45] Date of Patent: May 9, 1995

[54] METHOD OF DECREASING GAS/OIL RATIO DURING CYCLIC HUFF-N-PUFF PRACTICE

[75] Inventor: Robert L. Horton, The Woodlands, Tex.

[73] Assignee: Texaco Inc., White Plains, N.Y.

[21] Appl. No.: 125,368

[22] Filed: Sep. 22, 1993

[51] Int. Cl.$^6$ .................... E21B 33/138; E21B 43/22
[52] U.S. Cl. .................................. 166/294; 166/305.1
[58] Field of Search ............ 166/267, 292, 294, 305.1

[56] References Cited

U.S. PATENT DOCUMENTS

| | | | |
|---|---|---|---|
| 2,876,840 | 3/1959 | Berry, Jr. | 166/305.1 X |
| 3,093,192 | 6/1963 | Allen | 166/305.1 X |
| 3,411,583 | 11/1968 | Holm et al. | 166/305.1 |
| 4,130,165 | 12/1978 | Fast et al. | 166/305.1 X |
| 4,205,723 | 6/1980 | Clauset, Jr. | 166/305.1 X |
| 5,095,984 | 3/1992 | Irani | 166/294 X |

*Primary Examiner*—George A. Suchfield
*Attorney, Agent, or Firm*—James L. Bailey; Kenneth R. Priem; Harold J. Delhommer

[57] ABSTRACT

A method of recovering hydrocarbons from an underground reservoir with a cyclic injection/production process, wherein after one or more injection and production cycles, a second recovery fluid is injected into the formation comprising a cosolvent, a solute, preferably polydimethylsiloxane, and the primary recovery fluid such as carbon dioxide, said second fluid composition designed for solute to drop out of solution in the formation during the later soaking and production phases.

13 Claims, No Drawings

METHOD OF DECREASING GAS/OIL RATIO DURING CYCLIC HUFF-N-PUFF PRACTICE

BACKGROUND OF THE INVENTION

This invention relates to the recovery of hydrocarbons from an underground reservoir by cyclic injection and production processes, wherein formation permeability and the gas/oil ratio is lowered, and oil recovery increased with the use of one or more additives in the recovery fluid.

Numerous methods of enhanced oil recovery exist which involve the injection of a gaseous or a gaseous/liquid fluid into an underground formation. Recovery is often best where the fluid is injected at conditions so as to make the fluid miscible or conditionally miscible with the underground hydrocarbons. For non-thermal systems, the chief recovery fluid has been carbon dioxide.

Gaseous or gaseous/liquid recovery fluid methods may be divided into two types: drive processes and cyclic processes, which are also known as huff-n-puff or push/pull. In drive oil recovery processes, injection and production of fluids occur at different wells. In cyclic oil recovery processes, injection and production of fluids occur through the same well. Besides those structural differences, drive and cyclic processes are substantially different in that slugs of recovery fluid are designed differently, times of recovery are different, well patterns are different, costs are different, fluid velocities are different, and so forth.

Unlike drive recovery methods, cyclic processes are better suited for small oil reservoirs, particularly with the use of existing wells. The cost of recovery with a drive process in some smaller reservoirs, especially in deeper zones, may be so high as to make the reservoirs border-line candidates at best for oil recovery after primary or secondary recovery.

One of the earliest disclosures of a cyclic oil recovery process was in U.S. Pat. No. 3,480,081, wherein the flooding medium was water, brine or steam. The success of steam cyclic recovery processes inevitably lead to the cyclic injection and production of carbon dioxide with a soaking. U.S. Pat. No. 4,390,068 discloses such a carbon dioxide cyclic process. Cyclic carbon dioxide recovery has now become a commonplace event in the oil field.

Attempts to recovery heavy oils and hydrocarbons from tar sands have lead to a number of processes involving the injection of various solvents and hot fluids in "pressurization and drawdown" methods. These are similar to cyclic carbon dioxide methods in that various solvents and fluids are injected into the formation through a well to increase formation pressure. The fluids may or may not be allowed to soak in the formation prior to producing the injected fluids along with hydrocarbons through the same well. U.S. Pat. No. 4,324,291 is one example of these processes.

U.S. Pat. No. 4,913,235 teaches a method for increasing the viscosity of an injected solvent by the addition of a polydimethylsiloxane type polymer and a cosolvent such as toluene. The drive process disclosed therein is somewhat effective in countering horizontal conformance problems resulting from viscosity differences between injected solvent and reservoir fluids, but is relatively ineffective in minimizing preferential movement of injected solvent through high permeability regions.

A variation of the above method is disclosed in U.S. Pat. No. 5,095,984, wherein the enhanced oil recovery drive process is designed so that the viscosifying surfactant or polymer, such as polydimethylsiloxane, is soluble in the drive solvent under the injection conditions of temperature and pressure, but is substantially insoluble under the formation conditions of temperature and pressure. U.S. Pat. No. 5,095,984 discloses that polydimethylsiloxane or other solute can be precipitated in a drive process by (1) a temperature increase to reservoir temperature, or (2) dilution or separation of the cosolvent, but has no satisfactory solution for precipitation by varying pressure. The possibility of cyclic injection and production obviously never occurred to the author of this reference, for after he states that the lowering of pressure may achieve some precipitation, he concludes, "Unfortunately, any substantial pressure reduction in an underground formation is not a simple or quick task." He suggests the possibility of a sudden pressure pulse to drop solute in the desired location. See Col. 8:56-66.

SUMMARY OF THE INVENTION

The invention is a method of recovering hydrocarbons from an underground reservoir with a cyclic injection/production process, which comprises performing a cyclic recovery method with a few twists. Initially, a first recovery fluid is injected into the formation through a well, said recovery fluid selected from the group consisting carbon dioxide, nitrogen, sulfur dioxide, methane, ethane, propane, butane, pentane, and mixtures thereof. Injection is then ceased and the first fluid is allowed to soak in the formation for a period of about 1 to about 30 days. Hydrocarbons and other fluids are then produced through the same well.

After one or more injection and production cycles, a second recovery fluid is injected into the formation through the same well, said second fluid comprising a cosolvent, a solute, preferably polydimethylsiloxane, and a fluid selected from the group of first recovery fluids, said second fluid composition designed for solute to drop out of solution in the formation. It is not necessary that the second recovery fluid have a composition equivalent to the first recovery fluid plus the cosolvent and solute. Injection of the second recovery fluid is ceased and the second fluid is allowed to soak in the formation for a period of about 1 to about 30 days. Finally, hydrocarbons and other fluids are produced through the well, leaving solute in the formation to reduce permeability.

DETAILED DESCRIPTION

In cyclic injection recovery, the low density and viscosity of the injected recovery fluid relative to the in-place fluids frequently leads to gas fingering and override, causing the injected recovery fluid to bypass large volumes of oil. Although this may be desirable in the injection phase, it is disadvantageous in the production phase, resulting in the production of excess gas and insufficient oil. These problems are greatly magnified by the presence of reservoir heterogeneity in the form of high permeability thief zones that offer a path of least resistance and facilitate premature gas breakthrough during the production phase of a cyclic process. Once gas breakthrough occurs during production, the gas/oil ratio skyrockets and oil recovery declines dramatically. The reservoir energy invested in the injection or huff cycle is no longer sitting behind the oil in the late part of the production or puff cycle, pushing oil towards the producer.

In cyclic processes other than steam, the recovery fluid of choice is carbon dioxide. Other recovery fluids that may be employed are nitrogen, sulfur dioxide, and low molecular weight hydrocarbons such as methane, ethane, propane, butane, pentane, LPG, and mixtures thereof. The recovery fluid may be injected at conditions at which it is miscible or conditionally miscible with the underground hydrocarbons, but this is not necessary. Although carbon dioxide is frequently mentioned herein as the recovery fluid, it should be understood that other recovery fluids may be employed in the invention method in steps instead of carbon dioxide. In most cases, carbon dioxide will be the predominant constituent of the first and second recovery fluids.

The invention is a method of substantially reducing gas/oil ratios during the production phase of a cyclic process by delivering a plugging or permeability decreasing solute such as polydimethylsiloxane to higher permeability zones of the reservoir near the injection/production well during the second or subsequent injection/production cycles of the cyclic process. The reduction of these higher permeability zones during the production or puff phase means that the injection recovery fluid will push more hydrocarbons towards the production well for recovery.

The invention method requires the injection of a first recovery fluid into the formation through a well, said recovery fluid selected from the group consisting of carbon dioxide, nitrogen, sulfur dioxide, methane, ethane, propane, butane, pentane, and mixtures thereof. In most cases, the fluid will be predominantly carbon dioxide. Injection of the first fluid is then terminated and the first fluid is allowed to soak in the formation for a period of about 1 to about 30 days, preferably about 2 to about 10 days. The first huff-n-puff cycle is then finished by producing hydrocarbons and other fluids through the well.

After one or more initial cycles, a second recovery fluid is injected into the formation through the well, said second fluid comprising a cosolvent, a solute, and a fluid selected from the group of first recovery fluids. The second fluid composition is designed for solute, preferably polydimethylsiloxane, to drop out of solution in the formation. Injection of the second fluid is terminated, and the second fluid is allowed to soak in the formation for a period of about 1 to about 30 days, preferably about 2 to about 10 days. Hydrocarbons and other fluids are then produced through the well, leaving sufficient solute in the formation to reduce permeability.

The injection, soaking and production of the first fluid may be repeated prior to the injection of the second fluid. The injection, soaking and production of the second fluid may also be repeated as desired.

Although the recovery fluids contemplated herein may be injected in a liquid state (as is frequently the case with carbon dioxide), at usual reservoir conditions, the recovery fluids will be above their critical temperature, and their physical properties will vary with pressure. At greater pressures, the recovery fluids will behave more like liquids. The solubility properties of carbon dioxide and the other recovery fluids will decrease with decreasing pressure, and decrease with increasing temperature. Thus, if the recovery fluid is saturated with solute such as polydimethylsiloxane, the solute will tend to precipitate out as pressure decreases during cyclic production or temperature increases as the recovery fluid system warms and approaches formation temperature. Consequently, the solute may be precipitated from the second recovery fluid during the soak period by increasing temperature and during the production period by the decreasing pressure left in the region affected by the cyclic process.

The solubility of the injected recovery fluid may be enhanced by the use of a cosolvent. A cosolvent is defined as any material intentionally added to the primary recovery fluid prior to injection that enhances the dissolution of the solute into the recovery fluid. The cosolvent may be a hydrocarbon having from about 1 to about 20 carbon atoms, toluene xylene, benzene, ethylbenzene and alcohol, a ketone, or a mixture thereof.

Since the recovery fluids described herein are always injected into the formation at a temperature substantially lower than formation temperature, the recovery fluid will have a greater ability to solvate the solute prior to injection. After injection, the solute will tend to precipitate out of the recovery fluid as the recovery fluid warms to formation temperature. Additionally, by adjusting the concentration of the cosolvent, the recovery fluid can be designed to precipitate the solute out at any desired temperature at or below reservoir temperature. Furthermore, the recovery fluid, cosolvent and solute system may also be designed so that insubstantial precipitation occurs prior to the production or puff phase, with most precipitation occurring as fluids race towards the well during production as pressure substantially decreases.

Unlike the drive process of U.S. Pat. No. 5,095,984, precipitation of solute during the substantial pressure reduction of cyclic production is more likely to place the permeability decreasing solute in the high permeability streaks or zones where it is most needed. The gas rushing to escape the formation during cyclic production will pass through the high permeability streaks. Furthermore, the high permeability streaks are the location where the pressure drops in the formation will be the greatest, encouraging more solute to drop out at those locations.

Polydimethylsiloxane polymer available from the different sources, including General Electric Company, is an excellent solute for use in the invention. U.S. Pat. No. 5,095,984, the disclosure which is incorporated herein by reference, discloses solubility characteristics of polydimethylsiloxane as a function of temperature, pressure, and cosolvent concentration. In particular, it is noted that in a carbon dioxide and toluene cosolvent system with 6 wt % concentration of a 600,000 centistokes polydimethylsiloxane polymer, 3050 psia is required to maintain the 6 wt % polydimethylsiloxane polymer in solution for 9.6 vol % toluene and 3500 psia is required for a 7.1 vol % toluene case. Thus, when pressure for the 7.1 vol % toluene case falls below 3500 psia the system will no longer be able to maintain 6% polydimethylsiloxane in solution. The polymer will start dropping out. Similarly, if the cosolvent was diluted or separated from the recovery fluid such that the concentration of cosolvent decreased, polydimethylsiloxane, or other similar polymers would start dropping out of solution at the same reservoir pressure and temperature. At lower reservoir pressures and higher temperatures, greater quantities of solute would drop out of solution.

Additionally, for the 9.6 vol % toluene cosolvent case, 6 wt % polydimethylsiloxane will remain in solution at 100° F. and 3050 psia. But when temperature increases to 130° F., 3500 psia pressure is required to maintain solubility of the same 6% of solute. Thus, an increase in temperature from 100° to 130° F. at the same pressure would cause solute to drop out of solution. Moreover, in the invention disclosed herein wherein substantial temperature increases and substantial pressure decreases would occur during the soaking and production phases of the cyclic process, substantial quantities of solute (polydimethylsiloxane) would drop out of solution.

An additional difference over drive processes lies in the fact that is preferred to conduct the injection phase of a cyclic process at an injection rate high enough to drive the recovery fluid through the formation at a velocity greater than critical velocity. Since velocity greater than critical velocity promotes fingering and conformance problems, velocities greater than critical velocity are highly undesirable in hydrocarbon drive processes. For a discussion of critical velocity, please see U.S. Pat. Nos. 3,811,503; 3,878,892; 4,136,738; 4,299,286; 4,418,753; and 4,434,852, the disclosures of which are incorporated herein by reference.

However, in cyclic processes it is frequently desirable to promote fingering during the injection phase, as the reservoir volume invaded by the carbon dioxide is increased, allowing more residual oil to be contacted by the carbon dioxide. In general, experience has shown us that the volume actually invaded by carbon dioxide at high injection rates will be about 3 to about 5 times the actual reservoir volume of carbon dioxide injected. Thus, about 5% to about 15% of injected pore volume at sufficiently high injection rates can invade about 15% to as much as 75% of the reservoir volume.

After a soaking time period of about 1 to about 30 days, preferably about 2 to about 10 days, the shut-in well is reopened for production. It is preferred to control production so that the production well not immediately blow down and encourage fingering of the injected recovery fluid through the formation back to the well. It is desired to control the production phase so that velocity of the recovery fluid through the formation is lower during production than during injection.

If desired, multiple push/pull (huff-n-puff) cycles can be applied to the well with various slug sizes until economic limits are reached. In carbon dioxide cyclic practice, up to six or seven cycles have been performed on a single well. Of course, more could be performed if sufficient recovery was achieved in later cycles to justify further injection and production costs. The invention method should reduce the number of cycles needed per well.

Depending upon the number of wells in a field subjected to the invention method, economic limits can be extended by recycling the produced recovery fluid for further injection. This would involve separating the recovery fluid such as carbon dioxide from the produced fluids and reinjecting the separated recovery fluid with or without some produced hydrocarbons. Some quantities of produced hydrocarbons may enhance the ability of the recovery fluid such as carbon dioxide to recover additional hydrocarbons in future cycles. However, recycling produced hydrocarbons with the primary recovery fluid will affect the solubility of any solute such as polydimethylsiloxane added to the recovery fluid.

Many other variations and modifications may be made in the concepts described above by those skilled in the art without departing from the concepts of the present invention. Accordingly, it should be clearly understood that the concepts disclosed in the description are illustrative only and not intended as limitations on the scope of the invention.

What is claimed is:

1. A method of recovering hydrocarbons from an underground reservoir with a cyclic injection/production process which comprises:
    injecting a first recovery fluid into the formation through a well, said recovery fluid selected from the group consisting of carbon dioxide, nitrogen, sulfur dioxide, methane, ethane, propane, butane, pentane, and mixtures thereof;
    ceasing injection of the first fluid and allowing the first fluid to soak in the formation for a period of about 1 to about 30 days;
    producing hydrocarbons and other fluids through said well;
    injecting a second recovery fluid into the formation through said well, said second fluid comprising a cosolvent, a solute and a fluid selected from the group of first recovery fluids, said second fluid composition designed for solute to drop out of solution in the formation;
    ceasing injection of the second fluid and allowing the second fluid to soak in the formation for a period of about 1 to about 30 days; and
    producing hydrocarbons and other fluids through said well, leaving solute in the formation to reduce permeability.

2. The method of claim 1, further comprising repeating the injection, soak and production of the first fluid.

3. The method of claim 1, further comprising repeating the injection, soak and production of the second fluid.

4. The method of claim 1, wherein the first recovery fluid comprises carbon dioxide.

5. The method of claim 1, wherein the first and second recovery fluids comprise carbon dioxide.

6. The method of claim 1, wherein the solute precipitates out of the second recovery fluid by reducing formation pressure during production.

7. The method of claim 1, wherein the solute precipitates out of the second recovery fluid as the temperature of the second recovery fluid approaches formation temperature.

8. The method of claim 1, wherein the solute precipitates out of the second recovery fluid as the concentration of cosolvent in the second fluid decreases.

9. The method of claim 1, wherein the cosolvent is a hydrocarbon having from about 1 to about 20 carbon atoms, toluene, xylene, benzene, ethylbenzene an alcohol, a ketone, or a mixture thereof.

10. The method of claim 1, wherein the soak period is about 2 to about 10 days.

11. The method of claim 1, wherein further comprising injecting the first and second recovery fluids at an injection rate sufficient to force the recovery fluids to move through the formation at a velocity greater than critical velocity.

12. The method of claim 1, wherein the solute is polydimethylsiloxane.

13. A method of recovering hydrocarbons from an underground reservoir with a cyclic injection/production process which comprises:
    injecting a first recovery fluid comprising carbon dioxide into the formation through a well;

ceasing injection of the first fluid and allowing the first fluid to soak in the formation for a period of about 2 to about 10 days;

producing hydrocarbons and other fluids through said well;

injecting a second recovery fluid into the formation through said well, said second fluid comprising a cosolvent, polydimethylsiloxane, and carbon dioxide, said second fluid composition designed for polydimethylsiloxane to drop out of solution in the formation, said first and second recovery fluids injected into the formation at an injection rate sufficient to force the recovery fluids to move through the formation at a velocity greater than critical velocity;

ceasing injection of the second fluid and allowing the second fluid to soak in the formation for a period of about 2 to about 10 days; and producing hydrocarbons and other fluids through said well, leaving polydimethylsiloxane in the formation to reduce permeability.

* * * * *